(12) United States Patent
Yan et al.

(10) Patent No.: US 9,910,238 B2
(45) Date of Patent: Mar. 6, 2018

(54) LENS MODULE

(71) Applicant: AAC ACOUSTIC TECHNOLOGIES (SHENZHEN) CO. LTD., Shenzhen (CN)

(72) Inventors: Junjie Yan, Shenzhen (CN); Chuandong Wei, Shenzhen (CN); Chunhuan Fang, Shenzhen (CN); Lei Zhang, Shenzhen (CN); Liangwei Wan, Shenzhen (CN)

(73) Assignee: AAC ACOUSTIC TECHNOLOGIES (SHENZHEN) CO. LTD., Shenzhen (CN)

( * ) Notice: Subject to any disclaimer, the term of this patent is extended or adjusted under 35 U.S.C. 154(b) by 83 days.

(21) Appl. No.: 14/645,757

(22) Filed: Mar. 12, 2015

(65) Prior Publication Data
US 2015/0260942 A1   Sep. 17, 2015

(30) Foreign Application Priority Data

Mar. 14, 2014  (CN) .......................... 2014 2 01273717

(51) Int. Cl.
*G02B 9/34*   (2006.01)
*G02B 7/02*   (2006.01)
*G02B 7/00*   (2006.01)

(52) U.S. Cl.
CPC ............. *G02B 7/021* (2013.01); *G02B 7/003* (2013.01)

(58) Field of Classification Search
CPC ........ G02B 7/021; G02B 7/022; G02B 7/003; G02B 13/004; G02B 9/34; B29C 66/54; B29C 66/543; H04N 5/2254
See application file for complete search history.

(56) References Cited

U.S. PATENT DOCUMENTS

| 2006/0018036 | A1* | 1/2006 | Huang ..................... G02B 3/00 359/694 |
| 2006/0140623 | A1* | 6/2006 | Yu .......................... G02B 7/021 396/529 |
| 2009/0015945 | A1* | 1/2009 | Chen ....................... G02B 7/021 359/819 |
| 2013/0027788 | A1* | 1/2013 | Yen ...................... G02B 13/0045 359/763 |
| 2013/0050850 | A1* | 2/2013 | Lin ......................... G02B 7/021 359/738 |
| 2014/0029114 | A1* | 1/2014 | Kim ........................ G02B 3/08 359/709 |

\* cited by examiner

*Primary Examiner* — William R Alexander
*Assistant Examiner* — Balram Parbadia
(74) *Attorney, Agent, or Firm* — Na Xu; IPro, PLLC

(57) ABSTRACT

A lens module includes a lens barrel having a top wall that has a bottom surface, and a lens group received by the lens barrel. The lens group includes a first lens adjacent to the top wall and a second lens attached to the first lens. A first complementary configuration is arranged between the first lens and the top wall of the lens barrel for ensuring a concentricity between the lens group and the lens barrel, and a second complementary configuration is arranged between the first lens and the second lens for ensuring a concentricity between the first lens and the second lens.

13 Claims, 5 Drawing Sheets

LENS MODULE

FIELD OF THE INVENTION

The present invention relates to a lens module with lens group, and more particularly, to a miniature lens module applicable to a camera module or a photographing module of a handheld device, such as a tablet computer, a mobile phone, or a personal digital assistant (PDA) and etc.

DESCRIPTION OF RELATED ART

With the rapid development of technologies, electronic devices having image pick-up functions, such as cameras, mobile phones, portable computers, tablets, are equipped with lens modules. For satisfying the demands of high quality pictures, lens modules are designed and manufactured with high precisions. As one of the key characters of a lens module, concentricity is much important for performing high quality pictures.

Generally, a lens module comprises a holder for receiving a plurality of lens groups therein. The lens group should be provided with high concentricity to be concentric with each other, and the combination of the lens group should be concentric with the holder. During actual manufacturing process, the concentricity between the lens group, or between the lens group and the holder is difficult to be controlled. Thus, this disclosure provides a lens module provided with a special configuration for ensuring the concentricity thereof.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
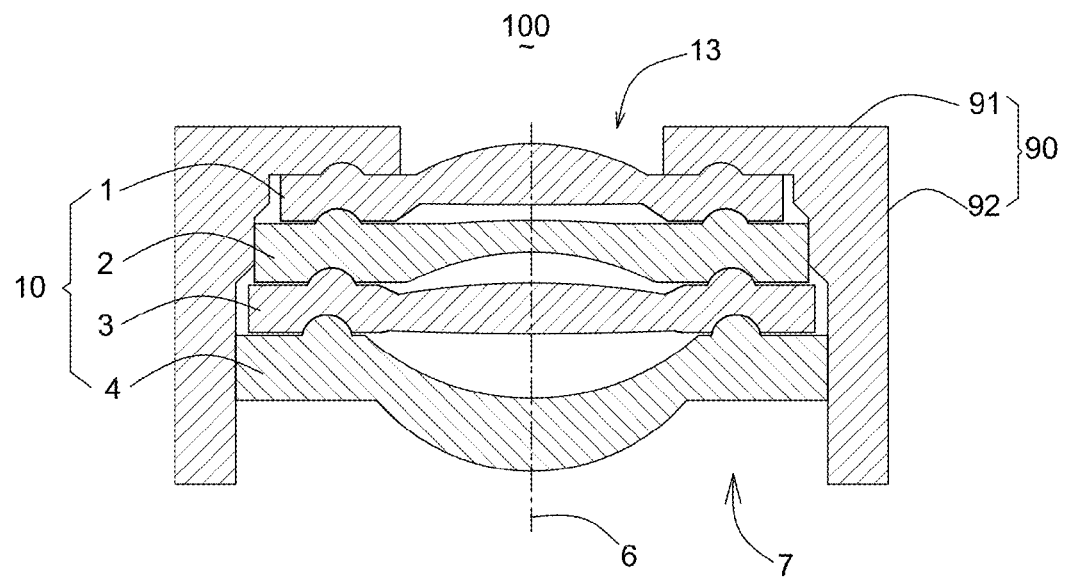
FIG. 1 is an illustrative cross-sectional view of a lens module in accordance with an first exemplary embodiment of the present disclosure.
Figure 2:
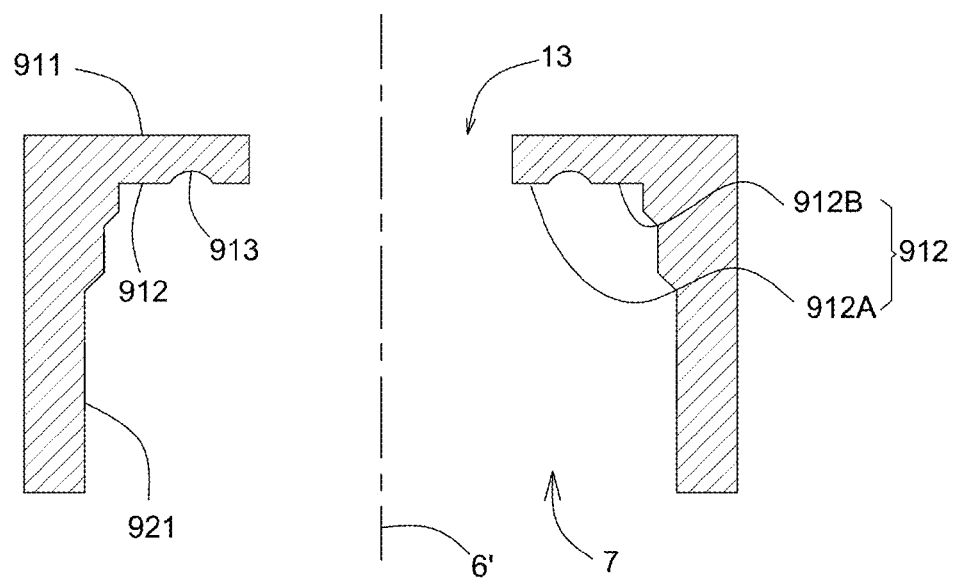
FIG. 2 is an illustrative cross-sectional view of a lens barrel of the lens module in FIG. 1.
Figure 3:
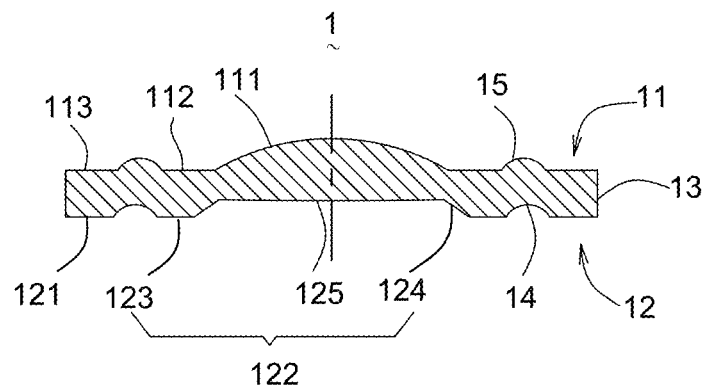
FIG. 3 is an illustrative cross-sectional view of a first lens used in the lens module in FIG. 1.
Figure 4:
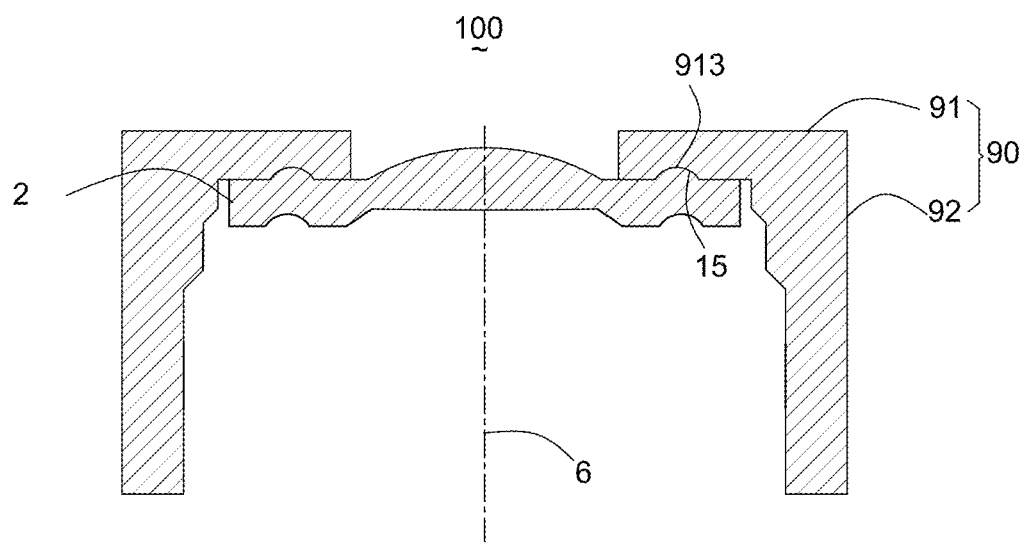
FIG. 4 is an illustrative cross-sectional view of the first lens in FIG. 3 assembled with the lens barrel in FIG. 2.
Figure 5:
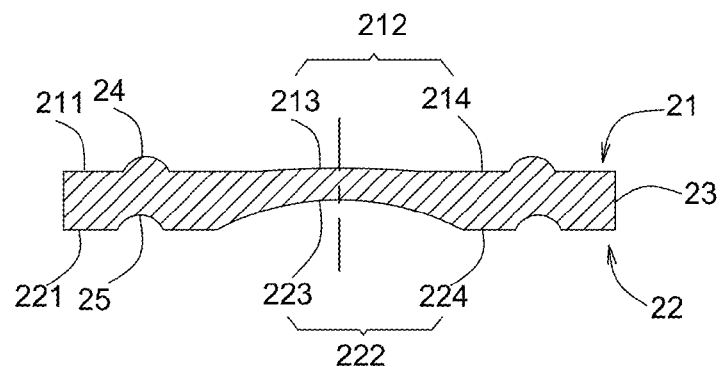
FIG. 5 is an illustrative cross-sectional view of a second lens used in the lens module in FIG. 1.

The present invention will hereinafter be described in detail with reference to exemplary embodiments. The first exemplary embodiment of the present disclosure provides a lens module that could be used in a mobile phone, a tablet, or a digital camera. Referring to FIGS. 1 and 2, a lens module 100 comprises a lens barrel 90 and a lens group 10 supported by the lens barrel 90. The lens group 10 has an optical axis 6. The lens barrel 90 comprises a first holder 91, a second holder 92 extending vertically from an edge of the first holder 91 and a receiving space 7 formed by the first holder 91 and the second holder 92. In this embodiment, the second holder 92 is integrated with the first holder 91. The first holder 91 comprises a top surface 911, a bottom surface 912 opposed and parallel to the top surface 911, and a light aperture 13 with a central axis 6' drilled through the top surface 911 and the bottom surface 912 for passing lights into the lens barrel 90. The bottom surface 912 of the first holder 91 has a first bottom surface 912 surrounding the light aperture 13, a second bottom surface 912B connected with the second holder 92, and a first engaging portion 913 connecting the first bottom surface 912A and the second bottom surface 912B and surrounding the central axis 6'. So, the first bottom surface 912A, the first engaging portion 913, and the second bottom surface 912B are arranged sequentially from a center to a periphery. The second holder 92 comprises an inner surface 921 jointing with and perpendicular to the bottom surface 912 of the first holder 91. The receiving space 7 is formed by the inner surface 921 and the bottom surface 912 cooperatively for receiving the lens group 10. The lens group 10 comprises a first lens 1, a second lens 2 stacked on the first lens 1, a third lens 3 stacked on the second lens 2 and a fourth lens 4 stacked on the third lens 3. The first lens 1 locates between the first holder 91 and the second lens 2. The first lens 1, the second lens 2, the third lens 3 and the forth lens 4 are aligned sequentially along the optical axis 6.

Referring to FIGS. 1-4, the first lens 1 comprises a first object-side surface 11, an first image-side surface 12 opposed to the first object-side surface 11 and a first sidewall 13 connecting the first object-side surface 11 and the first image-side surface 12. The first sidewall 13 keeps a predetermined distance from the inner surface 921 of the second holder 92. The first lens 1 further has a first concave portion 14 concave from the first image-side surface 12 towards the first object-side surface 11 and a second engaging portion 15 extending from the first object-side surface 11 towards the first holder 91 and surrounding the optical axis 6 for engaging with the first engaging portion 913. The first object-side surface 11 has a first object-side optical surface 111 arranged in the middle thereof and centered about the optical axis 6 for serving as an optical zone, a first abutting portion 112 connecting the first object-side optical surface 111 and one end of the second engaging portion 15, and a second abutting portion 113 connecting the other end of the second engaging portion 15 and the first sidewall 13. When assembled, the first bottom surface 912A abuts against the first abutting portion 112, the second bottom surface 912B abuts against the second abutting portion 113, the first engaging portion 913 abuts against the second engaging portion 15, and the first sidewall 13 at least partially abuts against the inner surface 921 of the second holder 92, thereby forming a first alignment precision for ensuring the central axis 6' is coaxial with the optical axis 6 and the misalignment between the lens group 10 and the lens barrel 90 can be prevented. Specially, the first engaging portion 913 and the second engaging portion 15 are configured to be a part of a circle, respectively, so, the amount of the engagement between the first holder 91 and the first lens 1 is four. In an alternative embodiment, the amount of the engagement between the first holder and the first lens may be less than four, such as only the first engaging portion abuts against the second engaging portion, and the bottom surface and the sidewall are kept a predetermined distance from the first holder, thereby the first alignment precision between the lens barrel and the lens group is determined solely by the engagement between the first engaging portion and the second engaging portion. The first engaging portion 913 is a concave shape and the second engaging portion 15 is a convex shape for mating the first engaging portion 913. Specially, outlines of the first and second engaging portions 913, 15 are configured to be a part of a circle. The first image-side surface 12 has a first image-side connecting portion 121 connecting the first sidewall 13 and one end of the first concave portion 14 and a first image-side extending portion 122 connecting the other end of the first concave portion 14. The first image-side extending portion 122 has a first image-side optical surface 125 arranged in the middle thereof and centered about the optical axis 6 for serving as an optical zone, a first inclining surface 124 connecting the first image-side optical surface 125 and surrounding the optical axis 6 and a first plane 123 connecting the first concave portion 14 and the first inclining surface 124.

Referring to FIGS. 1, 3-6, the second lens 2 comprises a second object-side surface 21, an second image-side surface 22 opposed to the second object-side surface 21 and a second sidewall 23 connecting the second object-side surface 21 and the second image-side surface 22. The second sidewall 23 at least partially abuts against the inner surface 921 of the second holder 92. The second lens 2 further has a first convex portion 24 extending from the second object-side surface 21 and away from the second image-side surface 22 for engaging with the first concave portion 14 of the first lens 1 and a second concave portion 25 concave from the second image-side surface 22 and towards the second object-side surface 21. The second object-side surface 21 has a second object-side connecting portion 211 connecting the second sidewall 23 and one end of the first convex portion 24 and a second object-side extending portion 212 connecting the other end of the first convex portion. The second object-side extending portion 212 has a second object-side optical surface 213 arranged in the middle thereof and centered about the optical axis 6 for serving as an optical zone and a second object-side plane 214 connecting the first convex portion 24 and the second object-side optical surface 213. The second image-side surface 22 has a second image-side connecting portion 221 connecting the second sidewall 23 and one end of the second concave portion 25 and a second image-side extending portion 222 connecting the other end of the second concave portion 25. The second image-side extending portion 222 has a second image-side optical surface 223 arranged in the middle thereof and centered about the optical axis 6 for serving as an optical zone and a second image-side plane 224 connecting the first convex portion 25 and the second image-side optical surface 223.

In this exemplary embodiment, the first image-side connecting portion 121 keeps a predetermined distance from the second object-side connecting portion 211 and the first image-side extending portion 122 keeps a predetermined distance from the second object-side extending portion 212. In another words, the first image-side surface 12 of the first lens 1 does not engage with the second object-side surface 21 of the second lens 2. Therefore, the concentricity between the first lens 1 and the second lens 2 is determined solely by the engagement between the first concave portion 14 of the first lens 1 and the first convex portion 24 of the second lens 2, which reduces the assembling tolerance and improves the assembling precision. The first concave portion 14 of the first lens 1 and the first convex portion 24 of the second lens 2 define a second alignment precision for holding the first lens 1 and the second lens 2 in precisely coaxial relationship. The first concave portion 14 of the first lens 1 engaged with the first convex portion 24 of the second lens 2 accordingly forms a first jointing surface 16. The first jointing surface 16 has a first farthest curve 161 far away from the first image-side surface 12, a first outer part 162 extending from the first farthest curve 161 towards the second holder 92 and a first inner part 163 extending from the first farthest curve 161 towards the optical axis 6. The first outer part 162 and the first inner part 163 are symmetrical with a plane 164 passed through the first farthest curve 161 and parallel to the optical axial 6. Optionally, a distance between the first farthest curve 161 and the first image-side surface 12 determines a thickness of the first lens 1.

Figure 6:
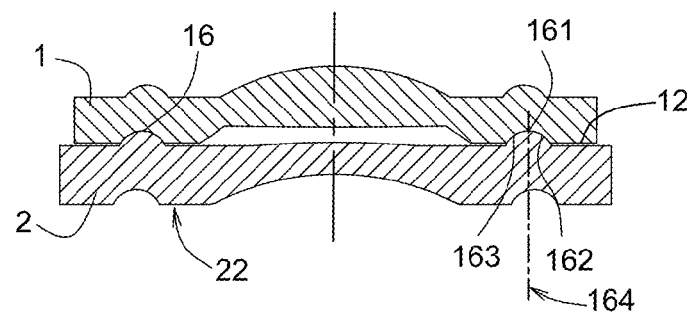
FIG. 6 is an illustrative cross-sectional view of the second lens in FIG. 5 stacked on the first lens in FIG. 3.
Figure 7:
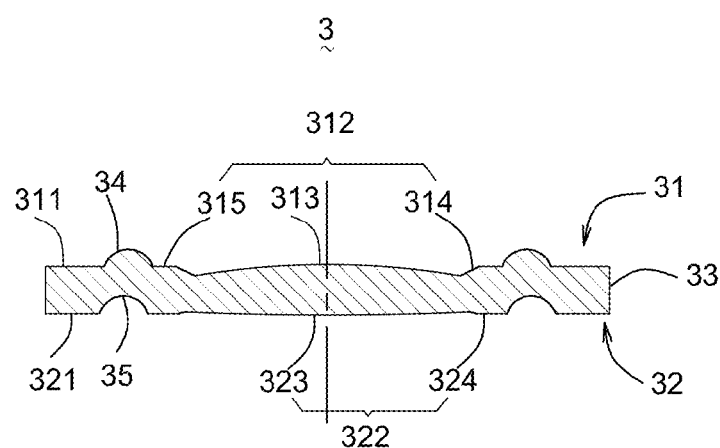
FIG. 7 is an illustrative cross-sectional view of a third lens used in the lens module in FIG. 1.
Figure 8:
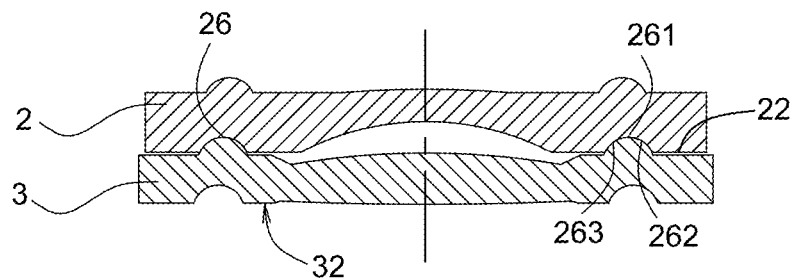
FIG. 8 is an illustrative cross-sectional view of the third lens in FIG. 7 stacked on the second lens in FIG. 5.

Referring to FIGS. 6-8, the third lens 3 comprises a third object-side surface 31, an third image-side surface 32 opposed to the third object-side surface 31 and a third sidewall 33 connecting the third object-side surface 31 and the third image-side surface 32. The third sidewall 33 keeps a distance from the inner surface 921 of the second holder 92. The third lens 3 further has a second convex portion 34 extending from the third object-side surface 31 and away from the third image-side surface 32 for engaging with the second concave portion 25 of the second lens 2 and a third concave portion 35 concave from the third image-side surface 32 and towards the third object-side surface 31. In this exemplary embodiment, the second concave portion 25 of the second lens 2 engages with the second convex portion 34 of the third lens 3 accordingly forms a second jointing surface 26. The second jointing surface 26 has a second farthest curve 261 far away from the second image-side surface 22, a second outer part 262 extending from the first farthest curve 261 towards the second holder 92 and a second inner part 263 extending from the second farthest curve 261 towards the optical axis 6.

The third object-side surface 31 has a third object-side connecting portion 311 connecting the third sidewall 33 and one end of the second convex portion 34 and a third object-side extending portion 312 connecting the other end of the second convex portion 34. The third object-side extending portion 312 has a third object-side optical surface 313 arranged in the middle thereof and centered about the optical axis 6 for serving as an optical zone, a third object-side inclining surface 314 extending from the third object-side optical surface 313 and away from the third image-side surface 32 and a third object-side plane 315 connecting the second convex portion 34 and the third object-side inclining surface 314. The third image-side surface 32 has a third image-side connecting portion 321 connecting the third sidewall 33 and one end of the third concave portion 35 and a third image-side extending portion 322 connecting the other end of the third concave portion 35. The third image-side extending portion 322 has a third image-side optical surface 323 arranged in the middle thereof and centered about the optical axis 6 for serving as an optical zone and a third image-side plane 324 connecting the third concave portion 35 and the third image-side optical surface 323. The second image-side connecting portion 221 keeps a predetermined distance from the third object-side connecting portion 311 and the second image-side extending portion 222 keeps a predetermined distance from the third object-side extending portion 312. Therefore, the concentricity between the second lens 2 and the third lens 3 is determined solely by the engagement between the second concave portion 25 of the second lens 2 and the second convex portion 34 of the third lens 3, which reduces the assembling tolerance and improves the assembling precision.

Figure 9:
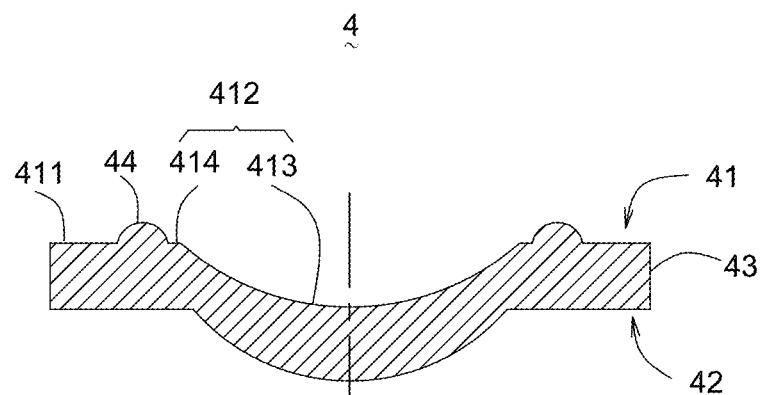
FIG. 9 is an illustrative cross-sectional view of a fourth lens used in the lens module in FIG. 1.
Figure 10:
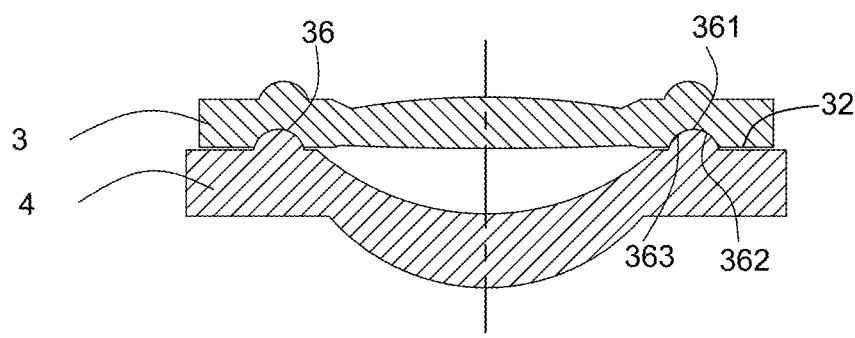
FIG. 10 is an illustrative cross-sectional view of the fourth lens in FIG. 9 stacked on the third lens in FIG. 7.

Referring to FIGS. 7, 9 and 10, the fourth lens 4 comprises a fourth object-side surface 41, an fourth image-side surface 42 opposed to the fourth object-side surface 41 and a fourth sidewall 43 connecting the fourth object-side surface 41 and the fourth image-side surface 42. The fourth sidewall 43 abuts against the inner surface 921 of the second holder 92 for ensuring the central axis 6' is coaxial with the optical axis 6. The fourth lens 4 further has a third convex portion 44 extending from the fourth object-side surface 41 and away from the fourth image-side surface 42 for engaging with the third concave portion 35 of the third lens 3. In this exemplary embodiment, the third concave portion 35 of the third lens 3 engages with the third convex portion 44 of the fourth lens 4 accordingly forms a third jointing surface 36. The third jointing surface 36 has a third farthest curve 361 far away from the third image-side surface 32, a third outer part 362 extending from the third farthest curve 361 towards the second holder 92 and a third inner part 363 extending from the third farthest curve 361 towards the optical axis 6.

The fourth object-side surface 41 has a fourth object-side connecting portion 411 connecting the fourth sidewall 43 and one end of the third convex portion 44 and a fourth object-side extending portion 412 connecting the other end of the third convex portion 44. The fourth object-side extending portion 412 has a fourth object-side optical surface 413 arranged in the middle thereof and centered about the optical axis 6 for serving as an optical zone and a fourth object-side plane 414 connecting the third convex portion 44 and the fourth object-side optical surface 413. The third image-side connecting portion 321 keeps a predetermined distance from the fourth object-side connecting portion 411 and the third image-side extending portion 322 keeps a predetermined distance from the fourth object-side extending portion 412. Therefore, the concentricity between the third lens 3 and the fourth lens 4 is determined solely by the engagement between the third concave portion 35 of the third lens 3 and the third convex portion 44 of the fourth lens 4, which reduces the assembling tolerance and improves the assembling precision.

Outlines of the concave portions 14, 25, 35 and the convex portions 24, 34, 44 are respectively configured to be a part of a circle for ensuring the concentricity between the lens group. In other words, the outlines of the convex portions 14, 25, 35 and the concave portions 24, 34, 44 are shaped as circular arc. The farther curves 161, 261, 361 are farther from the corresponding image-side surface 12, 22, 32 than other portion of the jointing surfaces 16, 26, 36 for placing the outer parts 162, 262, 362 and the inner part 163, 263, 363 on two sides of the corresponding farther curves 16, 26, 36, respectively, thereby the concentricity between the lens group is effectively enhanced, and the misalignment of the lens group 10 can be prevented.

Optionally, heights between the farthest curves 161, 261, 361 and the corresponding image-side surfaces 12, 22, 32 can be changed according to different desires. The concave portions may be interchanged with the corresponding first convex portions, such as the concave portion provided on the first lens may be interchanged with the first convex portion provided on the second lens. As a result, the first concave portion provided on the second lens and the first convex portion may be provided on the first lens.

Figure 11:
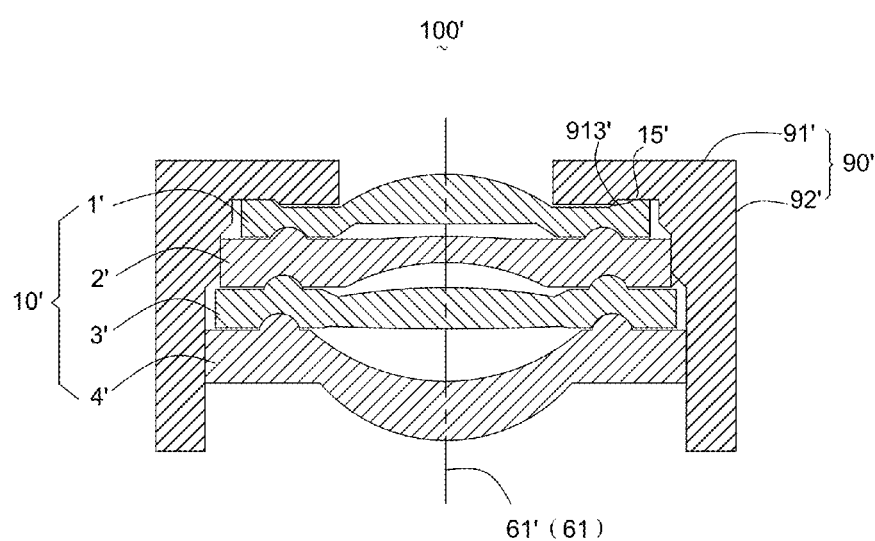
FIG. 11 is an illustrative cross-sectional view of a lens module in accordance with a second exemplary embodiment of the present disclosure.

A second embodiment is similar to that of the first embodiment of the present invention except the shape of a first engaging portion of a first holder and a second engaging portion of a first lens. Referring to FIG. 11, a lens module 100' comprises a lens barrel 90' with a central axis 61' and a lens group 10' with an optical axis 61 supported by the lens barrel 90'. The lens group 10' has a first lens 1', a second lens 2' stacked on the first lens 1, a third lens 3' stacked on the second lens 2', and a fourth lens 4' stacked on the third lens 3'. The lens barrel 90' has a first lens holder 91' and a second holder 92' extending vertically from an edge of the first holder 91'. The first holder 91' has a first engaging portion 913' with a bevel shaped and the first lens has a second engaging portion 15' with a bevel shaped and coupled with the first engaging portion 913'. Optionally, the shape of the first and second engaging portions may be in variety, as long as the first engaging portion is shaped to match the second engaging portion for forming the first alignment precision to ensure the central axis 61' is coaxial with the optical axis 61.

The cooperation or engagement between the first lens with a first circle concave portion and the second lens with a first circle convex portion for ensuring the concentricity between the first lens and the second lens when the first lens unit is stacked on the second lens unit, so that the misalignment can be prevented.

It is to be understood, however, that even though numerous characteristics and advantages of the present embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens module, comprising:
  a lens barrel comprising a first holder, a second holder extending downwardly from the first holder and a receiving space formed by the first holder and the second holder, the first holder having a light aperture with a central axis, the second holder having an inner surface facing the receiving space; and
  a lens group with an optical axis, comprising:
  a first lens abutting against the first holder for forming a first alignment precision for ensuring the central axis coaxial with the optical axis and having a first object-side surface, a first image-side surface opposite to the first object-side surface, and a first sidewall connecting the first object-side surface and the first image-side surface and keeping a predetermined distance from the inner surface of the lens barrel;
  a second lens stacked on the first lens and having a second object-side surface facing the first image-side surface, a second image-side surface opposite to the second object-side surface, and a second sidewall connecting the second object-side surface and the second image-side surface and abutting against the inner surface of the second holder;
  a third lens stacked on the second lens and keeping a predetermined distance from the inner surface of the second holder; and
  a fourth lens stacked on the third lens and abutting against the inner surface of the second holder;
  wherein the first holder has a first bottom surface surrounding the light aperture, a second bottom surface and a first engaging portion connecting the first bottom surface and the second bottom surface and facing the receiving space and surrounding the central axis of the first holder and the first lens has a first abutting portion abutting against the first bottom surface of the first holder, a second abutting portion abutting against the second bottom surface of the first holder, a second engaging portion extending from the first object-side surface towards the first holder and coupled with the first engaging portion, the second engaging portion connnecting the first abutting portion and the second abutting portion, respectively; and wherein the first engaging portion and the second engaging portion are configured to be a part of a circle, respectively.

2. The lens module as described in claim 1, wherein the first lens further has a first concave portion concave from the first image-side surface towards the first object-side surface and the second lens further has a first convex portion extending from the second object-side surface and away from the second image-side surface for engaging with the first concave portion of the first lens for forming a second alignment precision for ensuring the concentricity between the first lens and the second lens.

3. The lens module as described in claim 2, wherein the first concave portion of the first lens and the first convex portion are configured to be a part of a circle, respectively.

4. The lens module as described in claim 3, wherein the first concave coupled with the first convex forms a first jointing surface having a first farthest curve far away from the first image-side surface, a first outer part extending from the first farthest curve towards the second holder and a first inner part extending from the first farthest curve towards the optical axis.

5. The lens module as described in claim 2, wherein the first concave portion provided on the first lens is interchanged with the first convex provided on the second lens.

6. The lens module as described in claim 2, wherein the first image-side surface has a first image-side connecting portion connecting the first sidewall and one end of the first concave portion and a first image-side extending portion connecting the other end of the first concave portion, and the second object-side surface has a second object-side connecting portion connecting the second sidewall and one end of the first convex portion and keeping a predetermined distance from the first image-side connecting portion, and a second object-side extending portion connecting the other end of the first convex portion and keeping distance from the first image-side extending portion.

7. The lens module as described in claim 1, wherein the second lens further has a second concave portion and the third lens having a third object-side surface, a third image-side surface opposite to the third object-side surface, a third sidewall connecting the third object-side surface and the third image-side surface for keeping a predetermined distance from the inner surface of the second holder, and a second convex portion extending from the third object-side surface away from the third image-side surface for engaging with the second concave portion.

8. The lens module as described in claim 7, wherein the second concave portion of the second lens and the second convex portion of the third lens are configured to be a part of a circle, respectively.

9. The lens module as described in claim 7, wherein the second image-side surface has a second image-side connecting portion connecting the second sidewall and one end of the second concave portion and a second image-side extending portion connecting the other end of the second concave portion, and the third object-side surface has a third object-side connecting portion connecting the third sidewall and one end of the second convex portion and keeping a predetermined distance from the second image-side connecting portion, and a third object-side extending portion connecting the other end of the second convex portion and keeping distance from the second image-side extending portion.

10. The lens module as described in claim 1, wherein the third lens further has a third concave portion and the fourth lens having a fourth object-side surface, a fourth image-side surface opposite to the fourth object-side surface, a fourth sidewall connecting the fourth object-side surface and fourth image-side surface for engaging with the inner surface of the second holder, and a third convex portion extending from the fourth object-side surface away from the fourth image-side surface for engaging with the third concave portion.

11. The lens module as described in claim 10, wherein the third concave portion of the third lens and the third convex portion of the fourth lens are configured to be a part of a circle, respectively.

12. The lens module as described in claim 10, wherein the third image-side surface has a third image-side connecting portion connecting the third sidewall and one end of the third concave portion and a third image-side extending portion connecting the other end of the third concave portion, and the fourth object-side surface has a fourth object-side connecting portion connecting the fourth sidewall and one end of the third convex portion and keeping a predetermined distance from the third image-side connecting portion, and a fourth object-side extending portion connecting the other end of the third convex portion and keeping a predetermined distance from the third image-side extending portion.

13. The lens module as described in claim 1, wherein the first engaging portion and the second engaging portion are configured to be a bevel shaped, respectively.

* * * * *